(12) United States Patent
Owen et al.

(10) Patent No.: US 10,511,486 B2
(45) Date of Patent: Dec. 17, 2019

(54) SYSTEM AND METHOD FOR AUTOMATING THE DISCOVERY PROCESS

(71) Applicant: ServiceNow, Inc., Santa Clara, CA (US)

(72) Inventors: Bradley David Owen, San Diego, CA (US); Chris Nguyen, San Diego, CA (US); Ardis Gabrielle Maison, San Diego, CA (US); Marjan Marzban, San Diego, CA (US); Amit Chandulal Dhuleshia, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 166 days.

(21) Appl. No.: 15/588,018

(22) Filed: May 5, 2017

(65) Prior Publication Data
US 2018/0324044 A1 Nov. 8, 2018

(51) Int. Cl.
*H04L 12/24* (2006.01)
*G06F 9/50* (2006.01)
*H04L 29/08* (2006.01)

(52) U.S. Cl.
CPC ........... *H04L 41/12* (2013.01); *G06F 9/5072* (2013.01); *H04L 41/0886* (2013.01); *H04L 41/22* (2013.01); *H04L 67/10* (2013.01)

(58) Field of Classification Search
CPC ... H04L 41/12; H04L 41/046; H04L 41/0853; H04L 41/0886; H04L 41/22; H04L 41/5058; H04L 67/10; H04L 67/1061; G06F 17/30377; G06F 9/5072
See application file for complete search history.

(56) References Cited

U.S. PATENT DOCUMENTS

| 6,477,572 | B1 | 11/2002 | Elderton et al. | |
|---|---|---|---|---|
| 2005/0234931 | A1* | 10/2005 | Yip | H04L 41/0816 |
| 2010/0115520 | A1* | 5/2010 | Kohno | G06F 9/4843 718/101 |
| 2013/0111036 | A1* | 5/2013 | Ozawa | H04L 41/0843 709/226 |
| 2013/0179537 | A1* | 7/2013 | Dawson | H04L 41/0816 709/217 |
| 2016/0112270 | A1* | 4/2016 | Danait | H04L 41/142 709/220 |
| 2016/0182284 | A1* | 6/2016 | Ayanam | H04L 41/0806 709/222 |
| 2016/0182299 | A1* | 6/2016 | Polinati | G06F 16/951 709/220 |

(Continued)

OTHER PUBLICATIONS

Extended European Search Report for European Application No. 18165100.1 dated Oct. 2, 2018; 11 pgs.

*Primary Examiner* — Alina A Boutah
(74) *Attorney, Agent, or Firm* — Fletcher Yoder PC

(57) ABSTRACT

Automating discovery server configuration as part of a discovery process includes determining one or more subnets selected from multiple subnets. Each of the one or more subnets selected is associated with a respective scheduled task. In response to determining the one or more subnets selected, one or more available discovery servers are identified from multiple discovery servers. The one or more discovery servers are configured based at least in part on the one or more subnets selected. In response to the automatic configuration, network discovery is initiated to perform the respective scheduled task.

20 Claims, 13 Drawing Sheets

(56) References Cited

U.S. PATENT DOCUMENTS

| | | | | |
|---|---|---|---|---|
| 2016/0308712 A1* | 10/2016 | Azriel | ............... | H04L 67/16 |
| 2017/0085427 A1* | 3/2017 | Polinati | ............ | G06F 16/951 |
| 2018/0019928 A1* | 1/2018 | Firment | ............ | G06F 9/5088 |
| 2018/0115462 A1* | 4/2018 | Makovsky | ......... | H04L 41/12 |
| 2018/0322189 A1* | 11/2018 | Xia | ............... | G06F 16/3334 |
| 2019/0104398 A1* | 4/2019 | Owen | ............ | H04W 8/005 |

* cited by examiner

FIG. 5

SYSTEM AND METHOD FOR AUTOMATING THE DISCOVERY PROCESS

TECHNICAL FIELD

The present disclosure relates in general to systems, methods, and apparatuses for tracking changes to configuration files used by configuration items and applications.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources (e.g., configuration items) hosted in distributed computing (e.g., cloud-computing) environments may be disparately located with each having its own functions, properties, and/or permissions. Such resources may include hardware resources (e.g. computing devices, switches, etc.) and software resources (e.g. database applications). These resources may be provided and provisioned by one or more different providers with different settings or values.

However, due to the complicated nature of the discovery process and the networks on which discovery is performed, the discovery process may involve a relatively lengthy configuration process to ensure that the discovery process performs correctly.

BRIEF DESCRIPTION OF THE DRAWINGS

The description herein makes reference to the accompanying drawings, wherein like reference numerals refer to like parts throughout the several views.

FIG. 5 is a discovery server selection screen that may be used in the discovery configuration process of FIG. 4, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an increasingly electronics-driven world in which various electronics devices are interconnected within a distributed context. As more functions are performed by services using some form of distributed computing, the complexity of IT network management increases. As these devices are separated geospatially, managing and tracking configuration of these devices may become more difficult.

Configuration Item (CI) discovery is used to track these devices. CI discovery is the process of finding computers and other devices connected to an enterprise's network. This discovery process may be performed at least partially using an application program. When a computer or device is found, discovery includes exploring the device's configuration, provisioning, and current status. This explored information is used to update a configuration management database (CMDB), accordingly. The CMDB stores and tracks all of the discovered devices connected to the network. On computer systems, the discovery process may also identify software applications running on the discovered devices, and any network connections (e.g., Transmission Control Protocol (TCP) connections) between computer systems. Discovery may also be used to track all the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed. Thus, using the discovery process, an up-to-date map of devices and their infrastructural relationships may be maintained.

Figure 1:
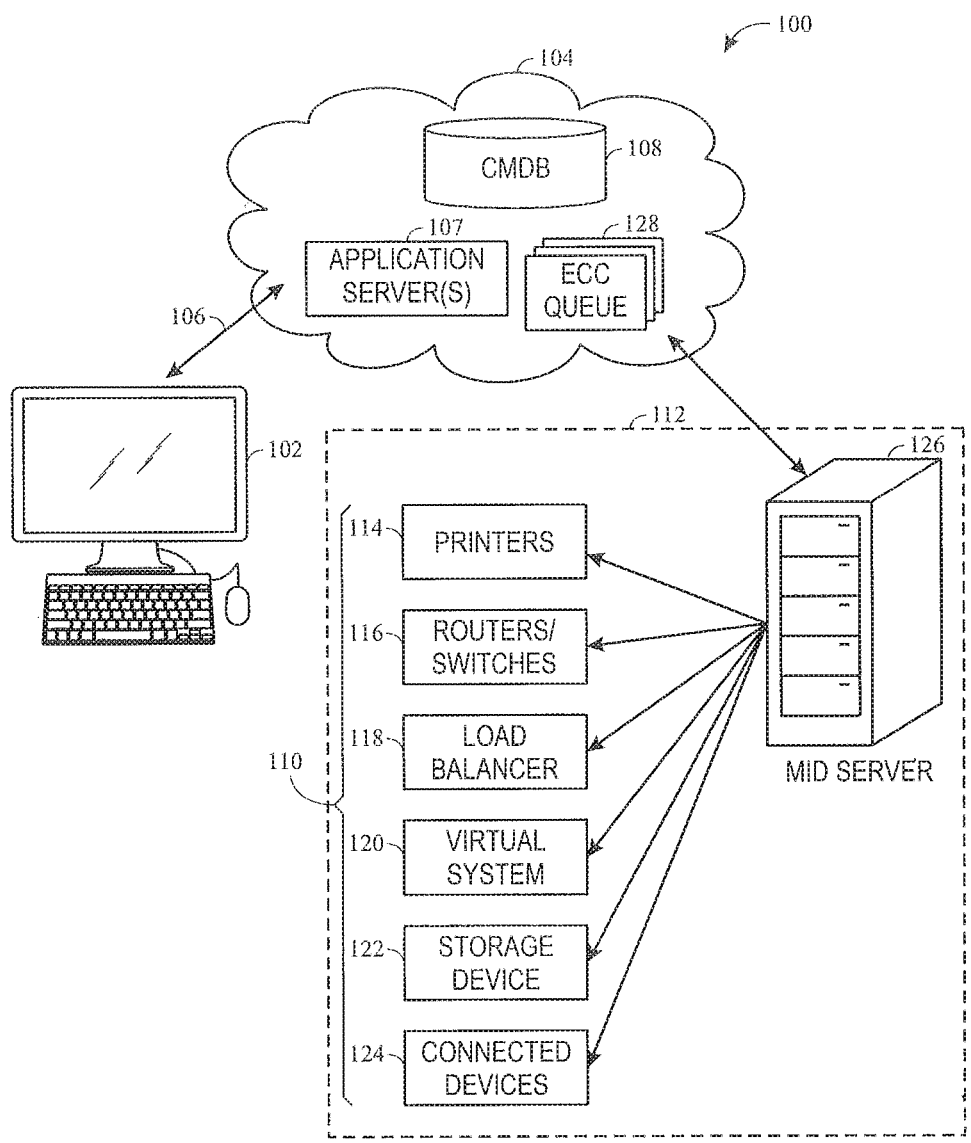
FIG. 1 is a block diagram of a distributed computing system utilizing a cloud service and a configuration management databases (CMDB), in accordance with an embodiment.

FIG. 1 is a block diagram of a system 100 that utilizes distributed computing. As illustrated a client 102 communicates with a cloud service 104 over a communication channel 106.

The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The cloud service 104 may include any suitable number of computing devices (e.g., computers) in one or more locations that are connected together using one or more networks. For instance, the cloud service 104 may include various computers acting as servers in datacenters at one or more geographic locations where the computers are connected together using network and/or Internet connections. The communication channel 106 may include any suitable communication mechanism for electronic communication between the client 102 and the cloud service 104. The communication channel 106 may incorporate local area networks (LANs), wide area networks (WANs), virtual private networks (VPNs), cellular networks (e.g., long term evolution networks), and/or other network types for transferring data between the client 102 and the cloud service 104. For example, the communication channel 106 may include an Internet connection when the client 102 is not on a local network common with the cloud service 104. Additionally or alternatively, the communication channel 106 may include network connection sections when the client and the cloud service 104 are on different networks or entirely using network connections when the client 102 and the cloud service 104 share a common network. Although only a single client 102 is shown connected to the cloud service 104, it should be noted that cloud service 104 may connect to multiple clients (e.g., tens, hundreds, or thousands of clients).

Through the cloud service 104, the client 102 may connect to various devices with various functionality, such as gateways, routers, load balancers, databases, application servers running application programs on one or more nodes, or other devices that may be accessed via the cloud service 104. For example, the client 102 may connect to an application server 107 and/or a configuration management database (CMDB) 108 via the cloud service 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the cloud service 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and business services controlled by a client 102 and the configurations of these assets and services. The assets and services include configuration items (CIs) 110 that may be computers, other devices on a network 112 (or group of networks), software contracts and/or licenses, or business services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the cloud service 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the cloud service 104 may have access to one or more databases external to the cloud service 104 entirely.

Access to the CIs 110 from the cloud service 104 is enabled via a management, instrumentation, and discovery (MID) server 126 via an External Communications Channel (ECC) Queue 128. The MID server 126 may include an application program (e.g., Java application) that runs as a service (e.g., Windows service or UNIX daemon) that facilitates communication and movement of data between the cloud service 104 and external applications, data sources, and/or services. The MID server 126 may be executed using a computing device (e.g., server or computer) on the network 112 that communicates with the cloud service 104. As such, in some embodiments, the MID server 126 may connect back to the cloud service 104 using a virtual private network connection that simulates the CIs 110 being connected to the cloud service 104 on a common physical network.

The MID server 126 may use discovery probes to determine information on devices connected to the network 112 and return the probe results back to the cloud service 104. Probes may have different types and functions. For example, some probes get the names of devices of specific operating systems (e.g., Windows or Linux) while other exploration probes return disk information for those devices using the operating systems. Some probes run a post-processing script to filter the data that is sent back to the cloud service 104.

As a non-limiting example, the probe types available for use by the MID server 126 may include a Common Information Model (CIM) probe that utilizes the CIM query language to query a CIM server using Web-Based Enterprise Management (WBEM) protocols, a Simple Network Manage Protocol (SNMP) probe to discover information about network devices (e.g., routers), a Windows Management Instrumentation (WMI) Runner probe that uses the WMI to obtain information about a Windows-based device, a Powershell probe that executes Powershell scripts (e.g., Powershell V2 scripts) on a host for the MID server 126, a Secure Copy (SCP) Relay Probe that copies a file or directory contents from one host to another via the MID server 126, a Secure Shell (SSH)-based probe that executes a shell command on a target host and returns the output, a Shazzam probe that determines what devices are active using a targeted port scan, a user-defined probe class, a multi-probe that combines probe types, and/or any combination thereof.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the cloud service 104 and the CIs 110 through communication with a border gateway device of the network 112.

The ECC queue 128 may be a database table that is typically queried, updated, and inserted into by other systems. Each record in the ECC queue 128 is a message from an instance in the cloud service 104 to a system (e.g., MID server 126) external to the cloud service 104 that connects to the cloud service 104 or a specific instance running in the cloud service 104 or a message to the instance from the external system. The fields of an ECC queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message. The agent field identifies a name (e.g., mid.server.xxxx) of the external system that the message is directed to or originates from. The topic field is a value (e.g., arbitrary values) that indicates that a message pertains to a particular subject. For example, during discovery of CIs 110, the topic field may be populated with a value to identify a name of the probe that has been/is going to be run. The name field provides more detail in a context indicated by the topic field. For example, in discovery, the name field may be a descriptive and human-readable name or a command to be run by the probe identified in the topic field. Alternatively, if the topic field contains "SSHCommand", the name field may indicate the shell command to be run.

The source field indicates a target or recipient of the message outside of the cloud service 104. In discovery, the source field may contain an Internet Protocol (IP) address that the discovery probe is to be/has been run against, or the field may include a human-readable description when the probe is to be/has been run against multiple IP addresses.

The response to field, when included, contains a reference (e.g., sys_id) to the ECC queue 128 that the message is a response to. In discovery, a discovery result may be a response to a discovery schedule message that is received in response to a probe.

The queue field indicates whether the message is incoming to the cloud service 104 or outgoing from the cloud service 104. The state field indicates whether the message is ready to be processed, is being processed, or has been processed. The recipient of the message generally updates this field. The time created field indicates when the record was first stored in the ECC queue 128. The time-processed field indicates when the record was updated to processed.

In some embodiments, the messages are sequenced using a sequencing field that includes a number assigned at generation of the record. The error string field, when included, indicates that an error occurred and/or a type of error that occurred.

The payload field is the body of the message. The contents of this field are specific to the context of the record and the system that is exchanging information with the cloud service 104. For example, a result of a discovery probe uses Extensible Markup Language (XML) documents for the payload. For instance, in some embodiments, the returned XML document may have a root tag of  containing one or more <result> tags and a single <parameters> tag. The parameters are simply an echo of those sent to the MID server 126 in the probe.

The cloud service 104 may allocate resources to users or groups of users in a multi-tenant and/or a single-tenant architecture. Allocating resources in a multi-tenant architecture includes installations or instantiations of one or more servers, such as application servers, database servers, or any other server, or combination of servers, that can be shared amongst a group of users. For example, a web server, such as a unitary Apache installation; an application server, such as a unitary Java Virtual Machine; and a single database server catalog, such as a unitary MySQL catalog, may handle requests from multiple users. In a multi-tenant architecture, the application server, the database server, or both may distinguish between and segregate data or other information of the various customers using the system. In summary, multi-tenant architecture provides a single instance of software and all of the supporting infrastructure of the software serves multiple customers. In other words, each user shares the software application program and a database. The database and the software application program tracks who the data belongs to.

In a single-tenant architecture (which can also be referred to as a multi-instance architecture), separate web servers, application servers, database servers, or combinations thereof may be provisioned for at least some users or sub-users sub-accounts) of those users. In the single-tenant architecture, one or more web servers are provided and dedicated to a user and/or sub-users of that user. Moreover, transactions are processed using one or more dedicated application servers, and data is stored in one or more database servers dedicated to the user or sub-users of that user. In summary, a single-tenant architecture includes a single instance serving only a single user and its sub-users). Thus, each user has its own database and instance of the software application program. In other words, the database and the software application program are not shared between users (outside of a user's sub-users).

In use, a user's instance may include multiple web server instances, multiple application server instances, multiple database server instances, and/or any combination thereof. The server instances may be physically located on different physical servers and may share resources of the different physical servers with other server instances associated with other customer instances.

Figure 2:
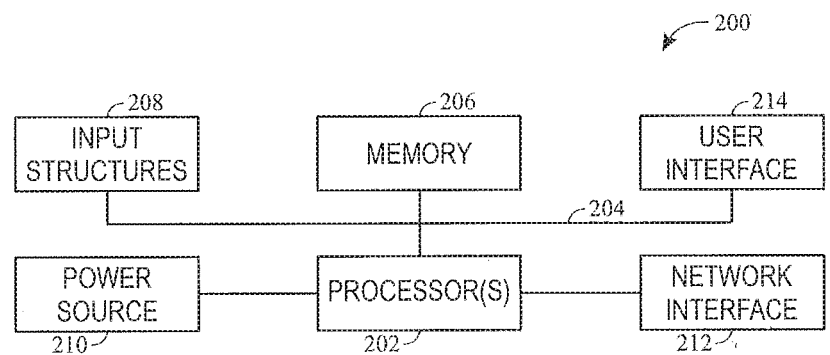
FIG. 2 is a block diagram of a computing device utilized in the distributed computing system of FIG. 1, in accordance with an embodiment.

FIG. 2 generally illustrates a block diagram of an embodiment of an internal configuration of a computing device 200. The computing device 200 may be an embodiment of the client 102, the application server 107, a database server (e.g., CMDB 108), other servers in the cloud service 104 (e.g., server hosting the ECC queue 128), device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interfaces 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other performing functions by executing instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives (SSD), external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
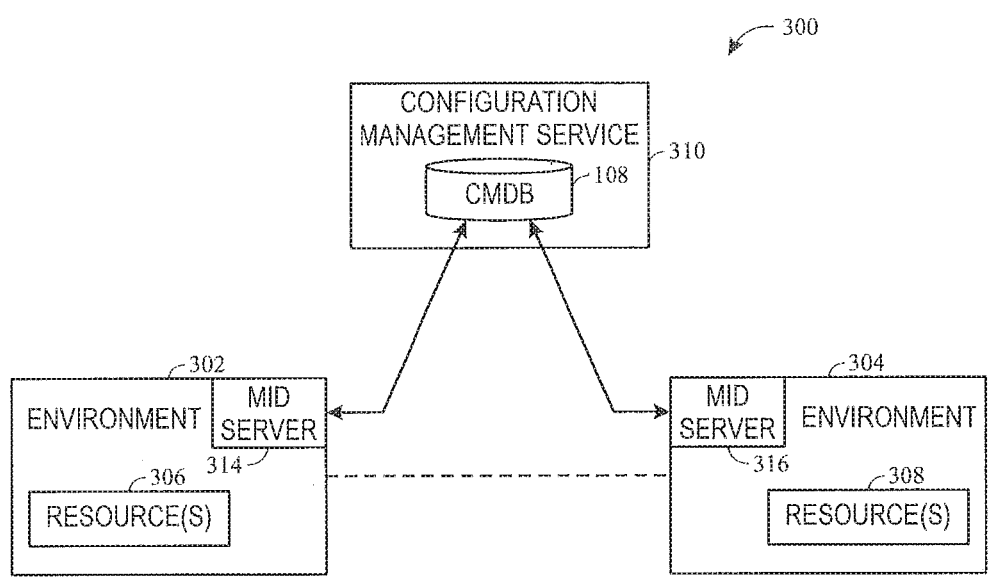
FIG. 3 is a block diagram of an electronic computing and communication system that utilizes the CMDB of FIG. 1, in accordance with an embodiment.

FIG. 3 is a block diagram of an embodiment of an electronic computing and communication system 300 for discovering and/or managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include a customer service environment used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 may of the environments 302, 304 may communicate with each other across environments. However, in some embodiments, aspects of various environments may be provided by different vendors without communication therebetween. In such embodiments, the resources of disparate environments may communicate using the cloud service 104 (e.g., a configuration management service 310 including the CMDB 108).

The resources 306 and 308 may be any suitable configuration item 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments may not directly communicate with each other). Using this catalogue, the configuration management service 310 may discover new resources, provision resources, allocate resources, modify, and/or remove resources from the catalogue across a single environment or multiple environments. In some embodiments, these actions may be initiated using the client 102, scheduled for periodic occasions (e.g., periodic discovery), or a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discover process, which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server may be employed when the MID server may reach into multiple environments. For example, if the MID server is run in the cloud service 104 (e.g., in the configuration management service 310), a single MID server may be used to manage both environments 302 and 304. Additionally or alternatively, if the MID server 126A has access to the environment 304, the MID server 126B may be omitted.

As previously discussed, each discovered resource is identified as a configuration item 110 with a record stored in the CMDB 108 including data indicating properties, attributes, dependencies, or other information about the resource. The CMDB 108 may be encoded as a relational database management system (RDBMS); an object-oriented database (e.g. an XML database); a network model database; or a flat-file database.

In some embodiments, configuration of the discovery process may be lengthy and complicated. Thus, to reduce duration of the configuration process for the discovery process, at least a portion of the configuration may be automated. Furthermore, this automated process may include automating asset management and/or scheduling discovery. Asset management may include software licensing and compliance measurements, database options (e.g., Oracle database, SQL servers), servers (e.g., Exchange server, Windows server), cloud management controls for servers (e.g., vCenter, Amazon Web services, Azure), and other configuration options. Through a guided setup, network discovery may be partially automated with credentials, run subnet discovery, and configure MID servers 126. In some embodiments, credential automation may include using stored credentials and/or prompting for credentials during discovery when a CI 110 discovered uses credentials prior to allowing access to a portion/function of the CI 110. Configuring the MID servers 126 may include mapping the MID servers 126 to subnets to which they belong/correspond. Configuration of the discovery process using the MID servers 126 may also include scheduling discovery, such as a prompt or an automated creation of a schedule with default ranges.

Figure 4:
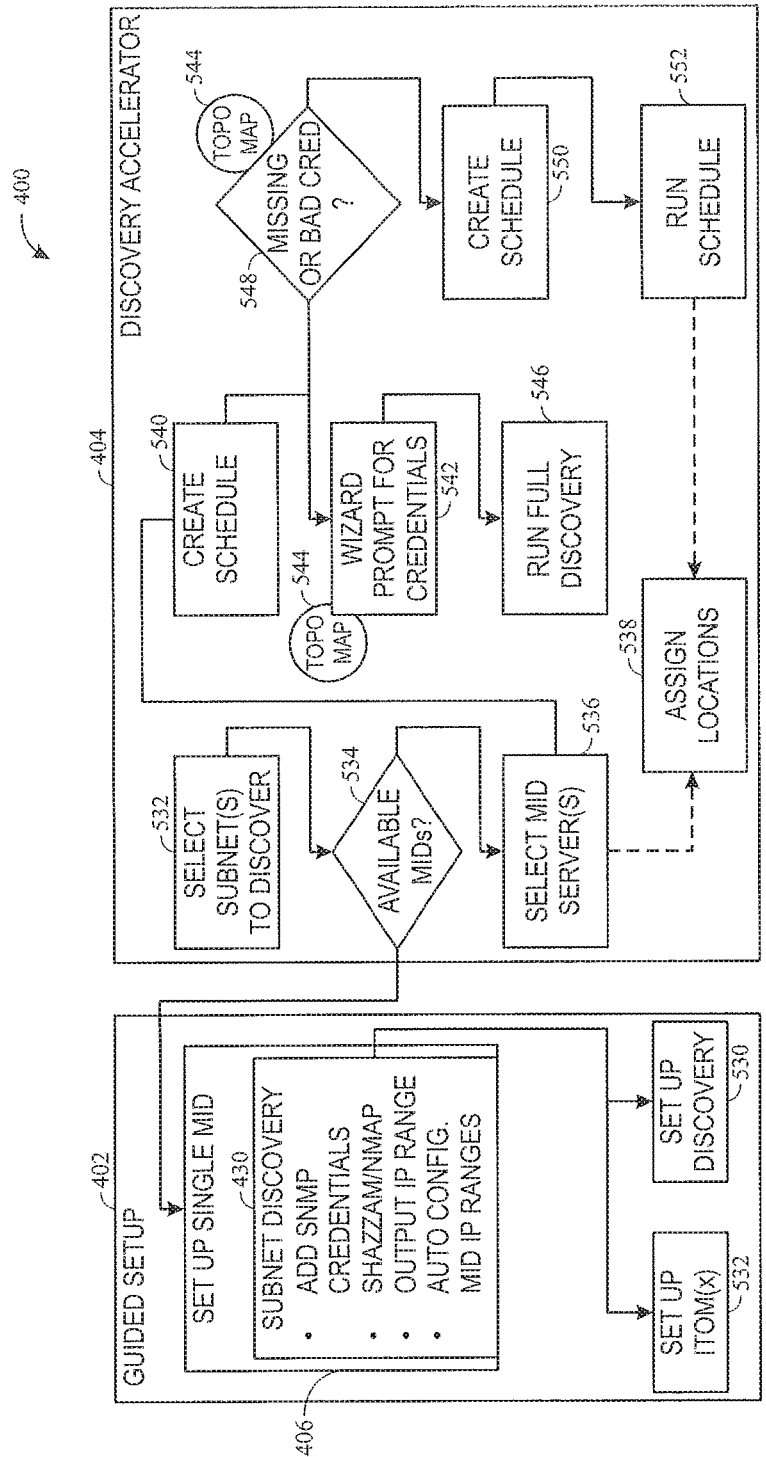
FIG. 4 is a flow chart of a discovery configuration process, in accordance with an embodiment.
Figure 5:
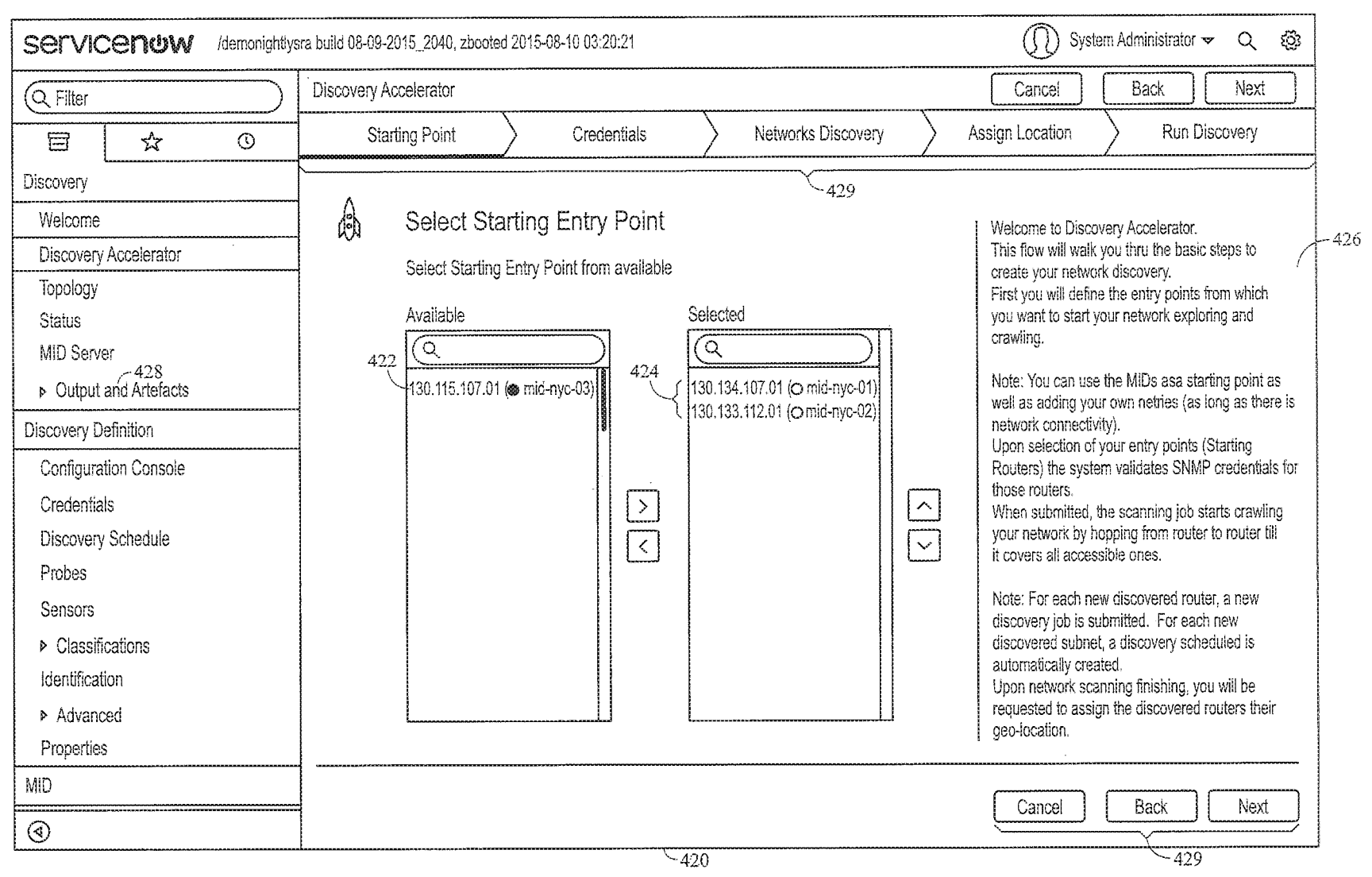

FIG. 4 illustrates an accelerated discovery configuration process 400 that may be used to configure a discovery process. The process 400 may include a guided setup unit 402 and a discovery accelerator unit 404. The guided setup unit 402 may be at least partially run (e.g., via a user interface displayed via a browser or run as an application) at the client 102 while some aspects may be executed in the cloud service 104. For example, the guided setup unit 402 may be hosted as an application program running on the cloud service 104 with a client program running on the client 102. As illustrated and discussed below, using the guided setup unit 402, one or more MID servers 126 may use a MID server setup component 406 of the guided setup unit 402. As discussed below, the selected MID servers 126 may be selected using a user interface, such as a MID server selection screen 420 illustrated in FIG. 5. The MID server selection screen 420 includes a list of available MID servers 422 available as entry points for the discovery process and a list of selected MID servers 424 selected as entry points for the discovery process. In some embodiments, devices (e.g., routers) may be added as entry points in addition to or in place of the MID servers. The MID server selection screen 420 may also include instructional and/or explanatory text to aid setting up the discovery process. The MID server selection screen 420 may also include navigational menus 428 to enable navigation within cloud management and/or discovery management applications. The MID server selection screen 420 also includes guided setup navigation buttons 429 to enable navigation through steps in the guided setup unit 402.

Returning to FIG. 4, after selecting an entry point, the guided setup unit 402 may setup discovery of a subnet through which the selected entry point provides access using a subnet discovery configuration unit 430. The subnet discovery configuration unit 430, as part of the guided setup 402, may be executed on the client 102, the cloud service 104, or a combination thereof. The subnet discovery configuration unit 430 includes storing credentials (e.g., user and password for SNMP) or settings. For example, settings may include ports to be scanned using a Shazzam probe, IP ranges to be discovered, and/or other settings used in discovering CI 110.

Figure 6:
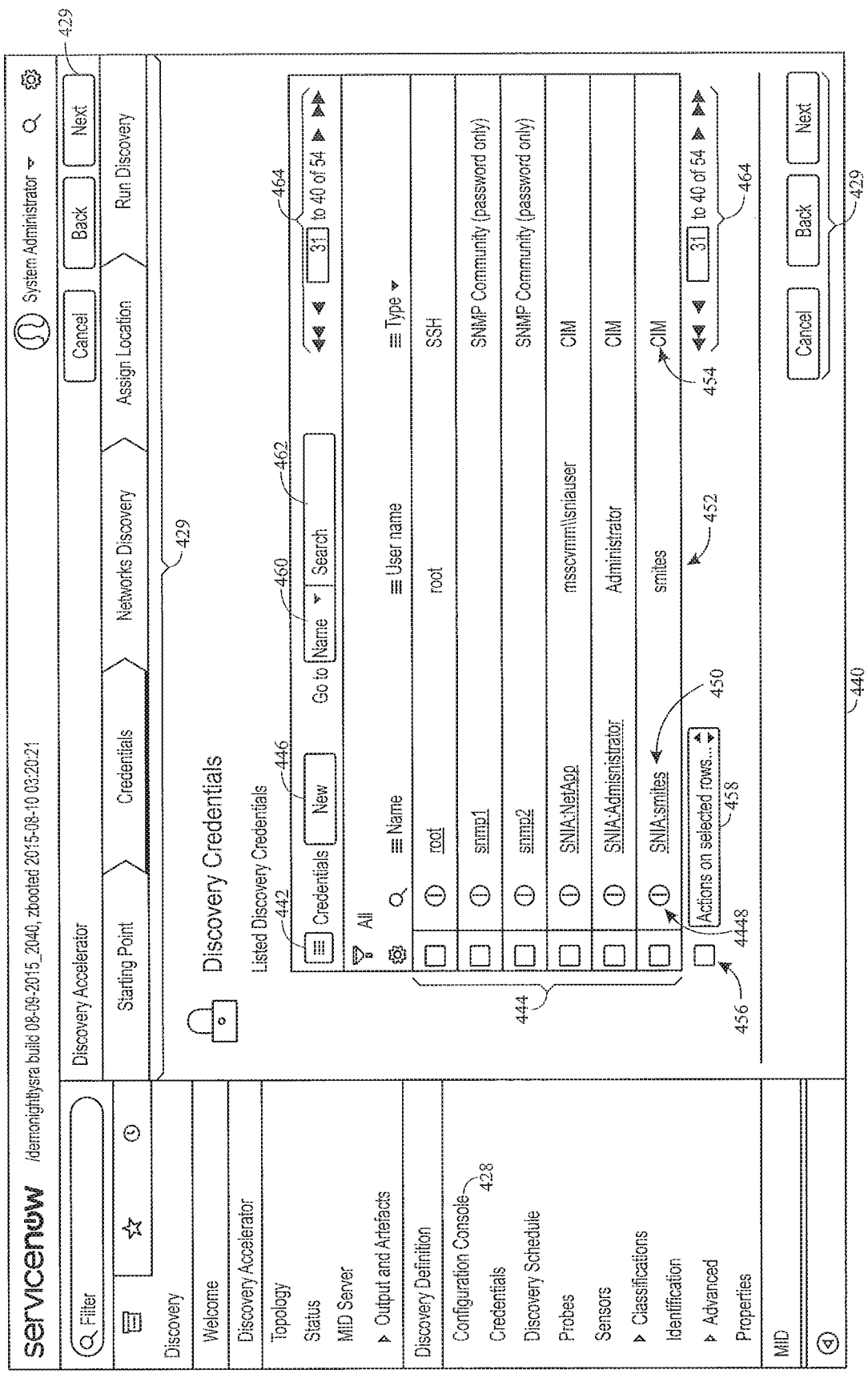
FIG. 6 is a credentials screen that shows which credentials are to be used in the discovery configuration process of FIG. 4, in accordance with an embodiment.

FIG. 6 illustrates a credentials screen 440 that shows which credentials are to be used in the discovery process. The credentials screen 440 includes a menu button 442 that enables navigation to the credentials screen or various discovery process settings windows (e.g., port discovery numbers, etc.). When on the credentials screen 440, the credentials screen 440 includes a list 444 of the credentials used in the discovery process. In some embodiments, the credential list can be prefiltered based on the targets of the discovery process. e.g. show only Windows credentials when discovering Windows. The credentials screen 440 also includes a create entry button 446 that creates a new credentials entry. Detailed information about each entry in the list 444 may be accessed using selection of information indicators 448. Additionally or alternatively, some information may be provided within the credentials screen 440 directly to indicate information without navigating to detailed information about each credential entry. For example, in the illustrated embodiment, each entry in the list 444 may include a name column 450, a user name column 452, and a type column 454. In some embodiments, the credentials screen 440 includes a verification button that validates the credentials with the target subnet/device type to be discovered to ensure that the credentials are correct.

In the illustrated embodiment, the credentials screen 440 also includes an ability to perform batch functions by selecting appropriate entries using a selection radio 456 and then selecting an action to be performed using an action selection 458. The action selection 458 includes a drop-down menu, but in some embodiments, the action selection 458 may include any suitable mechanism for selecting an action, such as a text input box, a list of actions, and/or any other selection mechanism.

Figure 7:
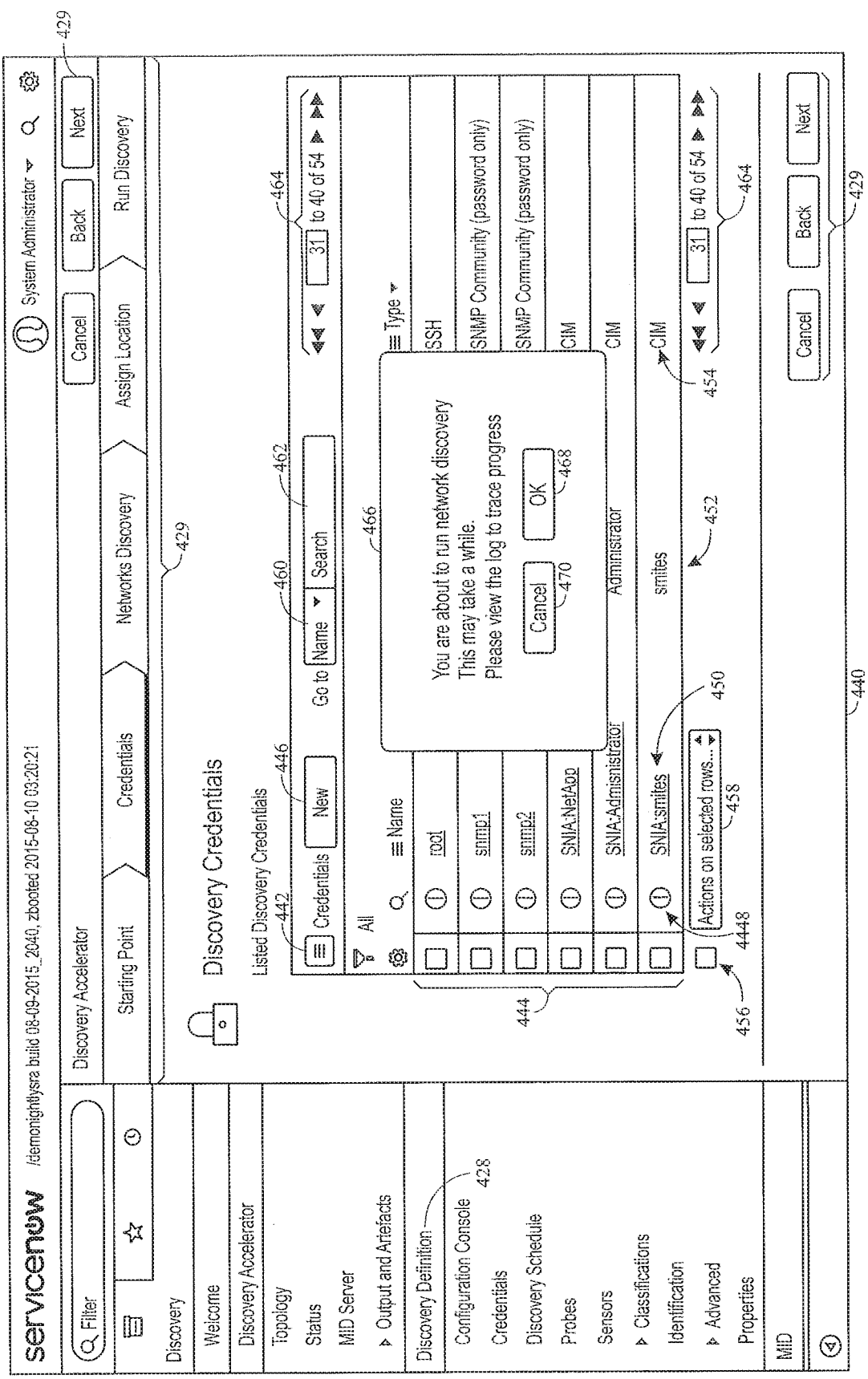
FIG. 7 is a confirmation window used in the discovery configuration process of FIG. 4, in accordance with an embodiment.

Furthermore, the illustrated embodiment of the credentials screen 440 may also include a search function. To search through the credentials to be used in the discovery process, a type of search may be selected using a search type control 460. Similar to the illustrated embodiment of the action selection 458, the search type control 460 is illustrated as a drop-down menu but may be embodied using any suitable selection mechanism. The search type control 460 enables selection of any metadata that may be stored in relation to the entries in the list 444. The criteria for the search may be input via a criteria input 462. In the illustrated embodiment, the criteria input 462 includes a text input box. However, in some embodiments, the criteria input 462 may include any other suitable input mechanisms for inputting criteria for the search. Once all of the credentials to be used are input and correct, the guided setup may be advanced by using the guided setup navigation buttons 429, network discovery is run by crawling through the network devices to discover all routers and associated subnets that may take some time and resources. To reduce accidental consumption of time and resources, in some embodiments, a confirmation may be made before the process continues. For example, FIG. 7 illustrates a confirmation window 466 includes a confirmation button 468 that moves the process forward and a confirmation cancel button 470 that keeps the process at the same step without moving the process forward.

Figure 8:
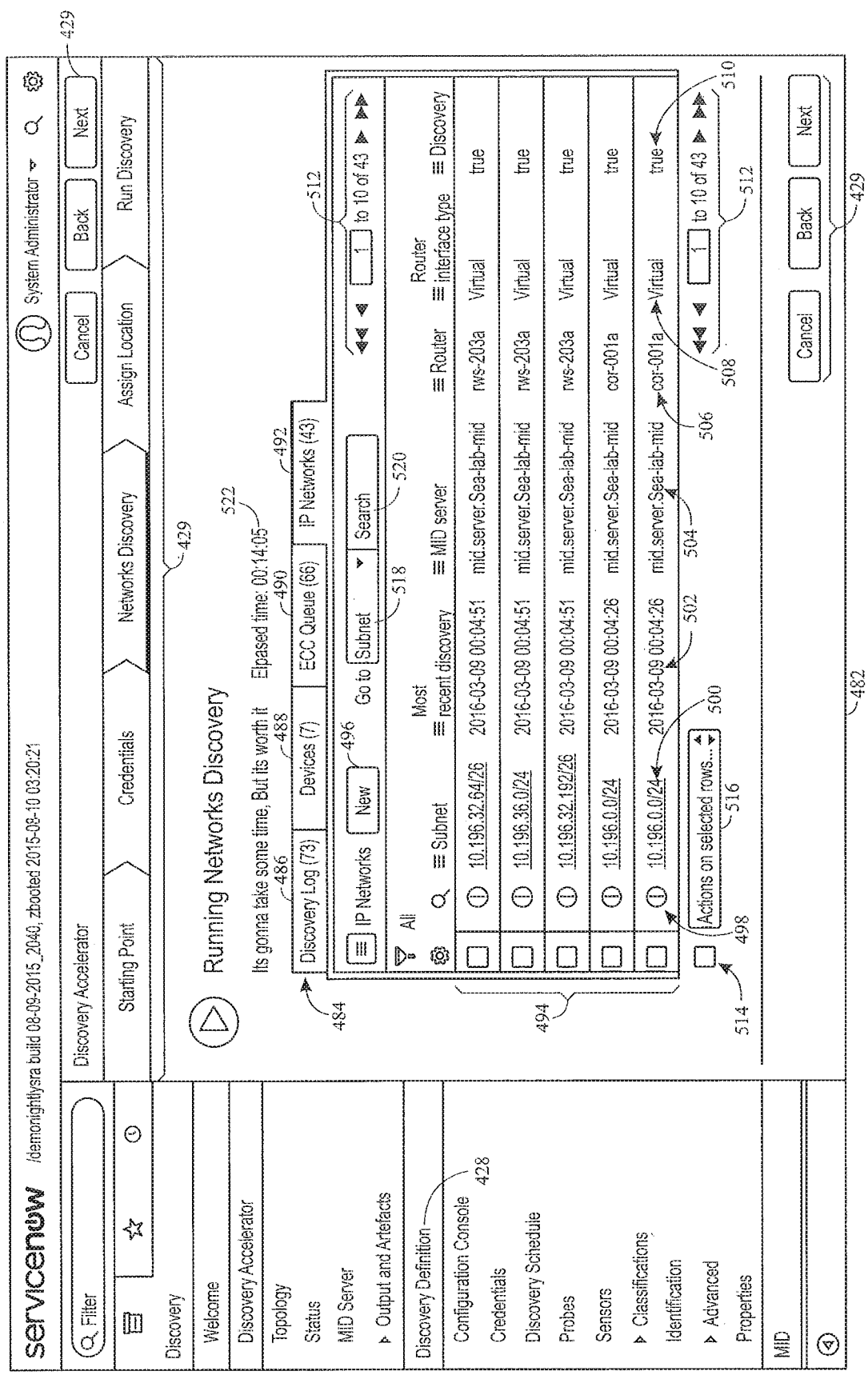
FIG. 8 is a running network discovery screen that may be used in the discovery configuration process of FIG. 4, in accordance with an embodiment.

During the network discovery, for each discovered neighbor (i.e., a router), a new discovery job is created until all network devices have been scanned. For each discovered subnet, a scheduled entry (e.g., daily) is created identifying the subnet as a target on which to run discovery. In some embodiments, if the same subnet is found via different entry points (e.g., MID servers), two separate entries detailing the different routing may be stored. Additionally or alternatively, a single entry may be stored with multiple potential routes. Alternatively, the single entry may select a preferred route based on factors, such as a number of hops, latency in route, geospatial distance traversed in the route, and/or any other suitable information related to routing used to connect with the target subnet. During and/or after the network discovery, a running networks discovery screen 482, as illustrated in FIG. 8, may be displayed. The running networks discovery screen 482 includes tabs 484 for reviewing information about a running networks discovery process. The tabs 484 may include a discovery log tab 486, a devices tab 488, an ECC queue tab 490, and IP networks tab 492. The discovery log tab 486 may display all relevant messages during the discovery process, such as devices/networks discovered, error messages, and other notifications. The devices tab 488 may indicate which devices are connected to the entry points being scanned and/or indicate devices that have been discovered via the entry points. The ECC queue tab 490 may include a log of any communications sent via the ECC queue 128. The IP networks tab 492 may include a list 494 of discovered networks in the discovery process. This list 494 may also be supplemented with manual entries appended to the list 494 using a new entry button 496. The list 494 may include information about the corresponding networks. For example, the list 494 may arrange entries in the list to include an information radio 498 that, when selected, causes the display of more detailed information about the respective entry in the list 494.

The list 494 may also display some commonly used information in the running networks discovery screen 482 directly. For example, the illustrated embodiment of the running networks discovery screen 482 includes a subnet address column 500, a most recent discovery column 502, a MID server access column 504, a router column 506, a router interface type column 508, and a discovery status column 510. The subnet address column 500 provides a subnet address corresponding to the entry. The most recent discovery column 502 indicates when the subnet was last discovered (e.g., last seen) in a discovery process. The MID server access column 504 indicates which MID servers) 126 may be used as an access point to the subnet. The router column 506 indicates which devices act as a router to connect to the subnet. For example, using the information from the list 494 an entry (e.g., first entry) may map a connection from the MID server 126 (e.g., mid.server.Sealab-mid) through the router (e.g., rsw-203a) to the subnet (e.g., 10.196.32.64/26). The router interface type column 508 indicates a type of interface for the router indicated in the router column 506. The discovery status column 510 indicates whether discovery for the entry is enabled or disabled. When the list 494 includes more entries than may be displayed in the running networks discovery screen 482, navigation buttons 512 may be used to navigate pages of entries of the list 494. Multiple entries may be acted upon simultaneously in a batch action using a selection radio 514 and an action selection menu 516. Furthermore, since the number of entries in the list 494 may be excessive, the networks discovery screen 482 may include a search input with a search type 518 and a criteria input 520. In some embodiments, the running networks discovery screen 482 may indicate that a duration 522 over which the networks discovery process has been running.

Returning to FIG. 4, the process 400 uses the guided setup 402 to setup discovery 530 and/or setup operation management, such as information technology operations management (ITOM). As part of the discovery setup, the discovery accelerator selects one or more subnet(s) that have been discovered using the networks discovery to discover devices within the subnet (block 532). In some embodiments, the subnets to undergo discovery may be selected from the discovered list. Additionally or alternatively, the subnets to undergo discovery may be any found subnets that have not been set to inactive. The accelerator then determines whether a MID server is available for the selected subnet (block 534). If none are available, the accelerator creates a discovery message that is sent back to the guided setup asking for selection of a MID server and/or indicating that a subnet is found with no available MID servers to complete discovery on the subnet. If a MID server is available, the accelerator selects a MID server (block 536). In some embodiments, when more than one MID server is available with the ability to reach the subnet, the accelerator may select a MID server based on business rules, such as available physical location of the potential MID servers, processing resources of a respective host machine of each of the potential MID servers, preferred vendors, host machine specifics, credentials available, and/or other criteria. This selection may be made based on a location of the MID server and/or the subnet. This information may be stored and accessed by the accelerator. For instance, the location of a MID server may be stored when the MID server is installed on the host machine, and the location of the subnet may be stored when the subnet is found in subnet discovery. In some embodiments, the subnet may be assigned as a location (e.g., geolocation) that corresponds to a geolocation of the corresponding MID server and/or other CIs accessed by the MID server. In some embodiments where the location of the subnet to be discovered has not already been assigned, the accelerator 404 assigns a location to the subnet (block 538). For example, the accelerator 404 may cause a prompt on the client 102 to be displayed via the guided setup when a subnet to be discovered does not have an assigned location (e.g., geolocation).

Figure 10:
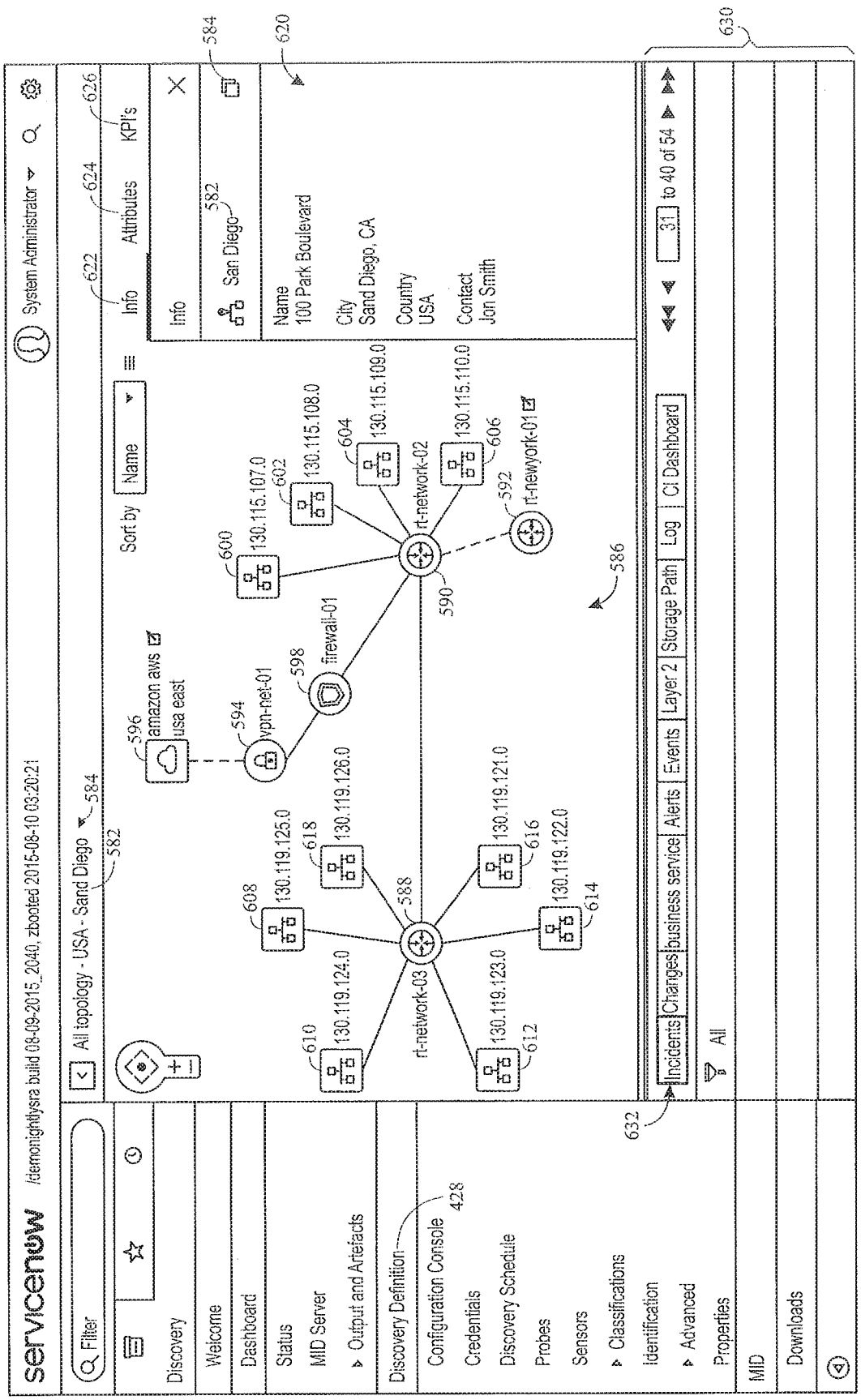
FIG. 10 is a topographical map having links between configuration items that may be used in the discovery configuration process of FIG. 4, in accordance with an embodiment.

Once the MID server route to the subnet has been selected, an initial discovery is run on the subnet (block 540). This initial discovery may discover network devices. For example, the initial discovery may include using SNMP discovery probes to discover routers and/or a Shazzam probe to scan specified ports on specific IP ranges. To access these devices, the accelerator may use a wizard for obtaining credentials that are not already stored (block 542). For example, the wizard may include a topographical map of the discovered assets as illustrated in FIG. 10 and discussed below that enables selection of specific assets in one of many visualizations (e.g., geolocational map, relational map, etc.). Using the credentials, the accelerator causes full discovery of each of the devices including obtaining specific attributes, such as IP addresses, MAC addresses, processing resource availability/consumption, storage path, data logs, alerts, events, and/or other information about the discovered devices.

If during the full discovery, the discovery fails for missing or bad credentials (block 548), the accelerator 404 may cause re-display of the wizard (e.g., topographical map) to attempt to obtain proper credentials.

Figure 9:
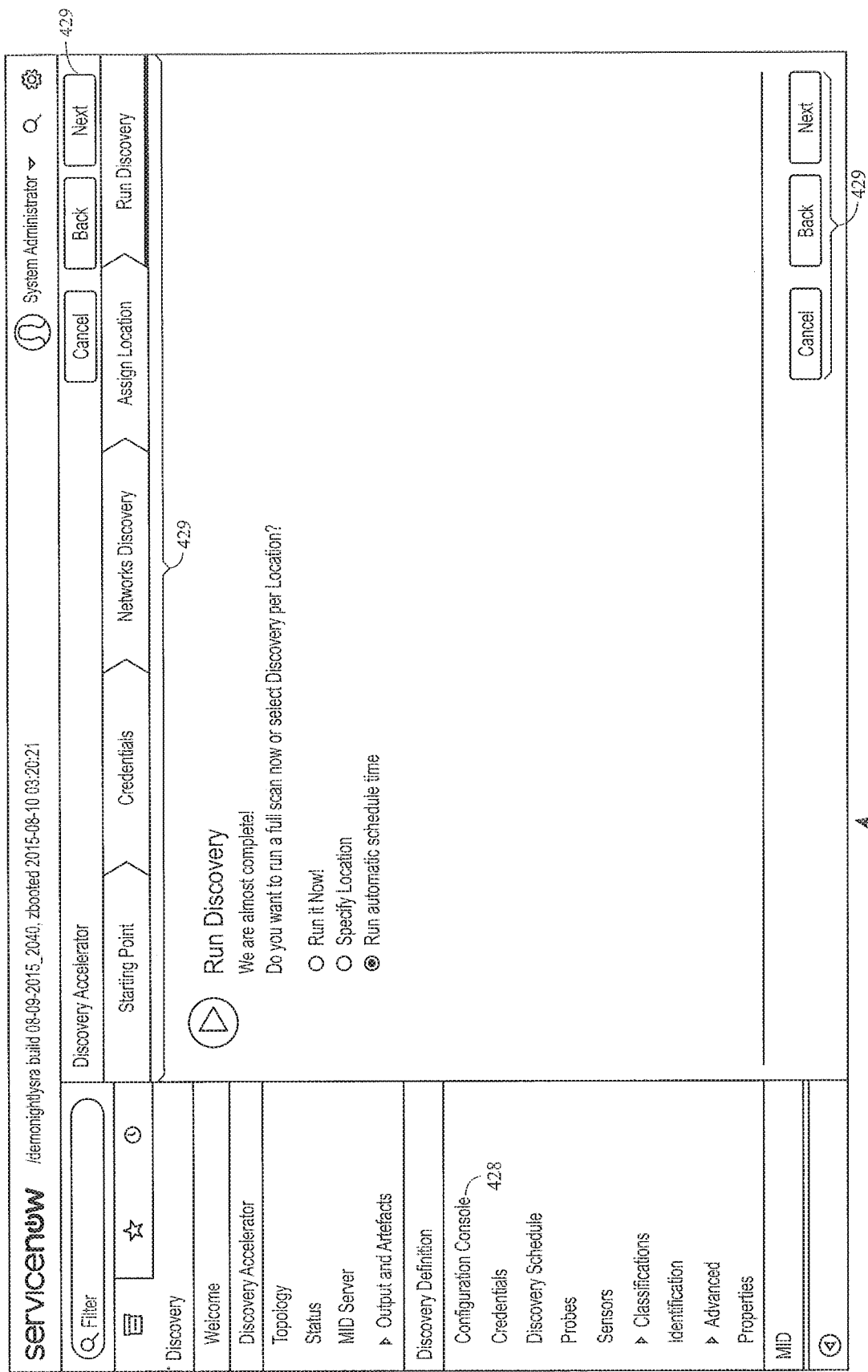
FIG. 9 is a discovery scheduling screen that may be used in the discovery configuration process of FIG. 4, in accordance with an embodiment.

Once the subnet has undergone discovery, the accelerator 404 creates a schedule to discover the subnet again to determine whether any changes have occurred (block 550). The created schedule may be used to run future discovery periodically (block 552). The schedule may be set according to any guiding rules related to scheduling. For example, if the subnets of the discovery network are divided into discovery by geolocation, the subnet may be scheduled to undergo discovery when other subnets in a closest or similar geolocation are discovered. However, if subnets are discovered according to the operating system of the devices thereon, the subnet may be scheduled to undergo discovery when subnets consisting of a similar makeup are also discovered. It is worth noting that any information available to the accelerator may be used to group subnets and/or devices for scheduling of discovery. In some embodiments, the generated schedule may be presented for confirmation via the client 102. For example, FIG. 9 illustrates a discovery screen 560 through which the auto-generated schedule may be selected for the discovery process, locations of CIs/subnets may be specified, and/or the discovery process may be initiated immediately.

FIG. 10 illustrates an embodiment of a topographical map screen 580 that may be used in configuring the discovery process. In administrating networks, a topology map may be helpful for viewing layer 3 and layer 2 relationships to better understand an infrastructure of the underlying networks. Furthermore, a geographic view of CIs may help in easing discovery deployment. For example, a geographic view may be used to confirm that newly placed CIs are discovered properly by ensuring that all CIs in a geolocation (e.g., data center) are present in the topographical map screen 580. By employing a drill-down scheme geolocational maps and interrelational maps may be combined. For example, the topographical map screen 580 illustrates a relational map at a location indicated by a location identifier 582. The location may be changed using a location menu 584. For example, selection of the location menu 584 may result in navigating up a level showing multiple locations (e.g., devices in California, devices in the United States, etc.). In some embodiments, the locational menu navigated to by the location menu 584 may include a list of locations, a geographical map, another suitable display mechanism, or any combination thereof.

The topographical map screen 580 also includes a topographical map 586. The topographical map 586 at the location indicated by the location identifier may illustrate any number of networks and connected devices. In the illustrated embodiment, the topographical map 586 illustrates networks 588, 590, 592, and 594. The networks 588 and 590 are physically located in the location (e.g., San Diego), but the networks 592 and 594 may be located in and/or spanning locations. For example, a dotted line may be used to show that networks in the location (e.g., network 590) connect to another network (e.g., network 592) that is located in a different location. Similarly, a dotted line may be used in reference to the virtual private network 594 spans locations to a node 596 (e.g., eastern server system) outside of the location. In connections spanning locations, one or more firewalls 598 may be employed.

In some embodiments, objects connected with a dotted line denoting objects outside the location do not have further connections outside of the location illustrated. In other words, the node 596 and the network 592 may be connected to other devices that are omitted from topographical map 586 for this location. However, since the networks 590 and 588 are in the location, the topographical map 586 illustrates the connections of the network 590 to subnets 600, 602, 604, and 606 and the connections of the network 588 to nodes 608, 610, 612, 614, 616, and 618.

The topographical map screen 580 may also enable direct interaction with subnets using selections and changes. To assist in management, the topographical map screen 580 includes an information pane 620 in which information about a selected subnet (e.g., subnet 600) may be indicated. For example, in an information tab 622, the information pane 620 may indicate a physical location, such as an address, geolocational (e.g., GPS) coordinates, and/or other information about where the subnet is geographically. In an attribute tab 624, the information pane 620 may display various attributes (e.g., operating system, device type, number of connected devices, processing resource allocation/availability, etc.) of the selected subnet. In a key performance indicator (KPI) tab that displays performance indicators of the device, such as availability/uptime, mean time between failures, mean time to repairs, periods of unplanned unavailability, average time, mean number of users, earned value for the device, costs for the device, and/or other performance indicators relative to the specific type of device being displayed.

The topographical map screen 580 also includes a lower pane 630. The lower pane 630 may be used to display various logs or relationships. For instance, the lower pane 630 may include multiple tabs 632 that, when selected, each causes the lower pane 630 to display respective information about the selected component. For example, the tabs 632 may cause the lower pane 630 to display logged incidents for the selected component, tracked changes to the selected component, information about the business service related to the component, alerts related to the component, events related to the component, a Layer 2 map of connections for the component, storage paths of the component, general activity logs for the component, or a CI dashboard for the component. In the illustrated embodiment, the tab 632 corresponding to incidents is selected, but no incidents have been logged. Thus, the lower pane 630 is empty.

Figure 11:
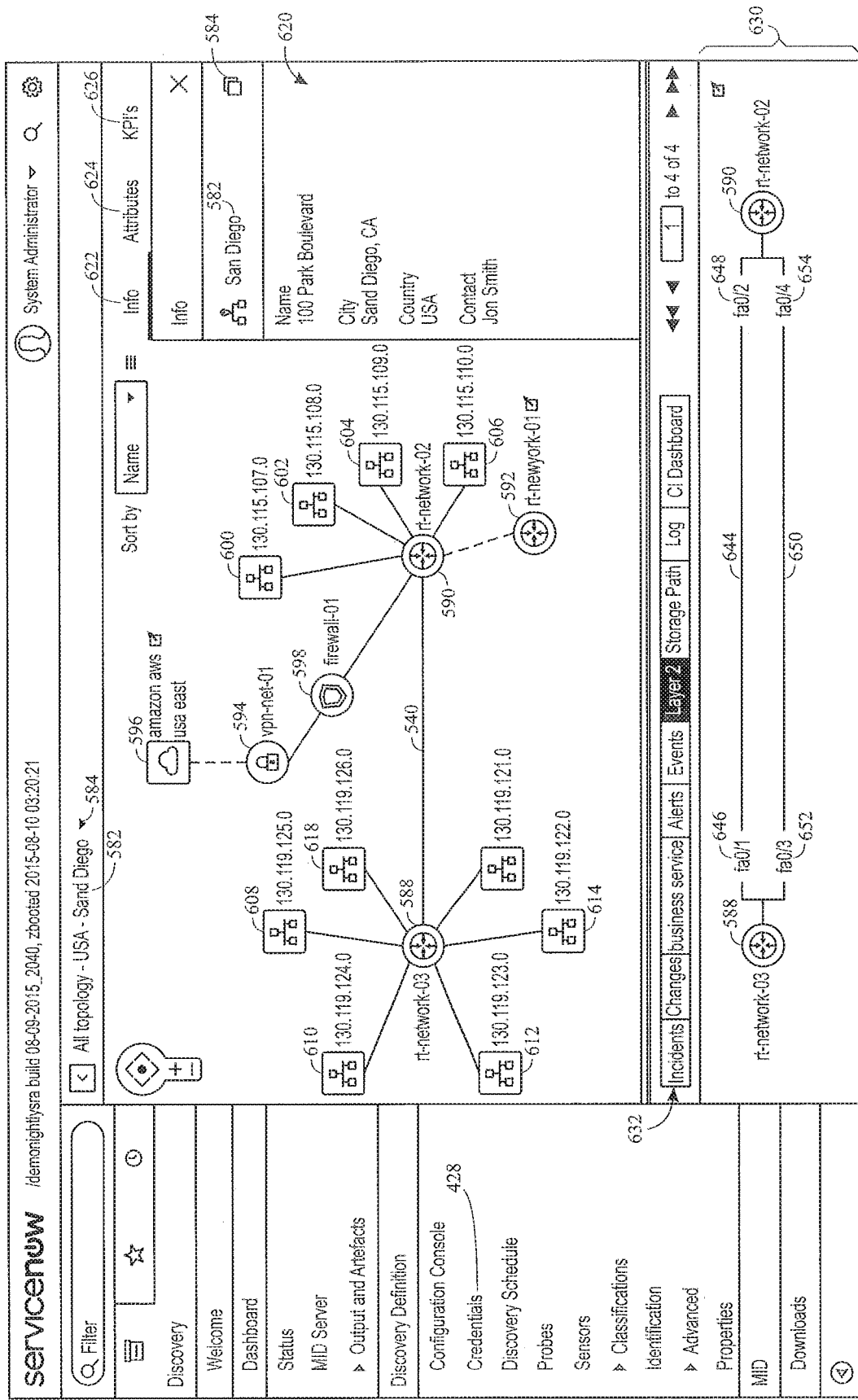
FIG. 11 is a topographical map after one of the links of FIG. 10 has been selected, in accordance with an embodiment.

FIG. 11 illustrates the topographical map screen 580 upon selection of a link 540 between the networks 588 and 590 and selection of a tab 632 corresponding to a Layer 2 map. As illustrated, this combination of selections causes the display of a Layer 2 map 642 showing an interconnection between networks 588 and 590. Specifically, the Layer 2 map 642 illustrates a first connection 644 between a fast Ethernet (i.e., potential rate of 100 megabits per second) module 0 first port (fa 0/1) 646 and the second port 648 on the fast Ethernet module 0 (fa 0/2). In other words, the switch router routes data from its first port 646 to its second port 648 and vice versa. Similarly, a second connection routes data received at a third port (fa 0/3) 652 to a fourth port (fa 0/4) 654 and vice versa. In other words, the Layer 2 map 642 provides a detailed description of how devices and/or subnets are actually connected together.

Figure 12:
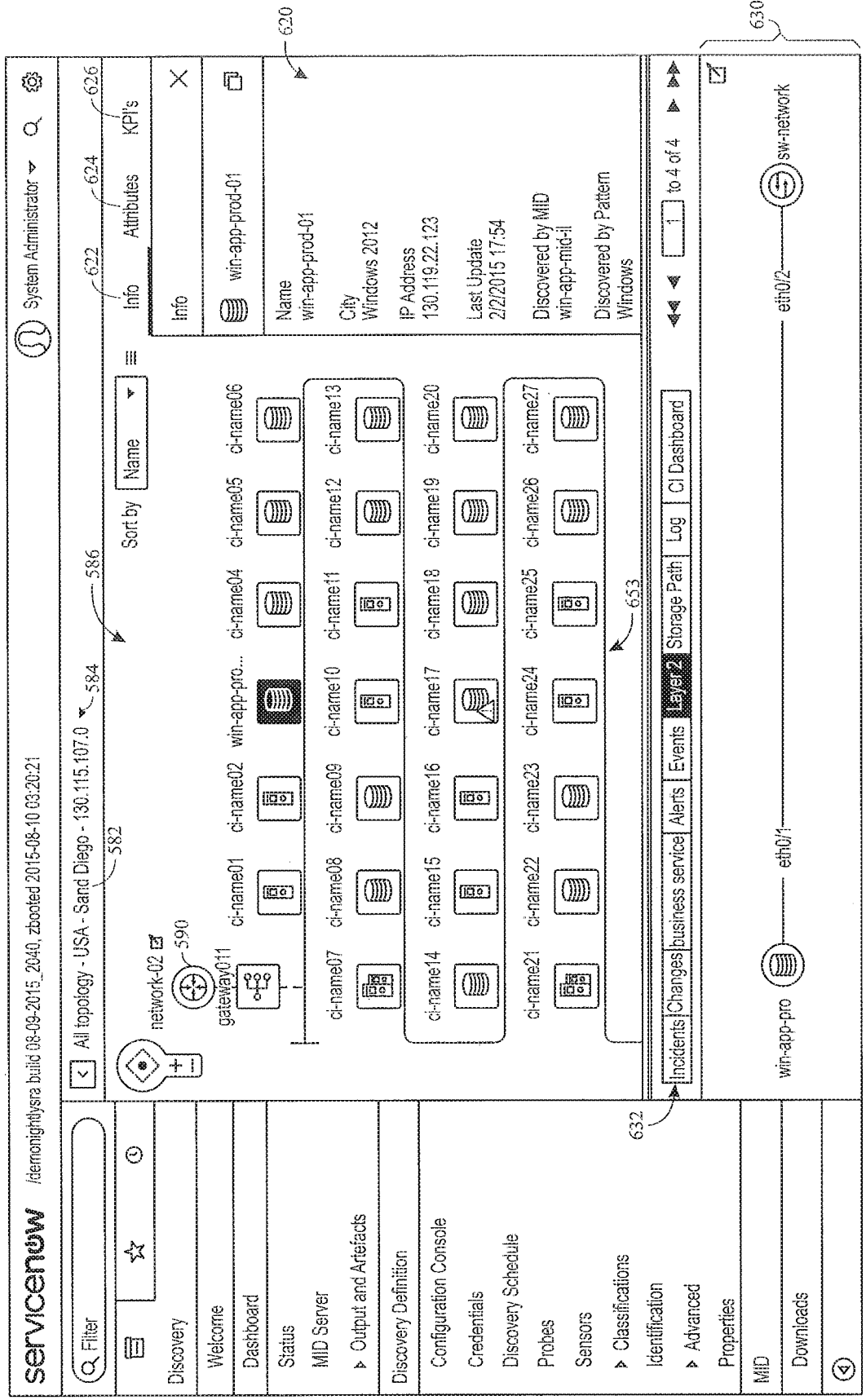
FIG. 12 is a drilled-down view of the topographical map of FIG. 11, in accordance with an embodiment.

Similar to how individual locations may be drilled-down-into, particular networks and/or subnets may also be drilled-down-into. For instance, FIG. 12 illustrates a drilled-down view of the network 590 and its connected devices 653 (rather than its subnets as illustrated in FIGS. 10 and 11).

Figure 13:
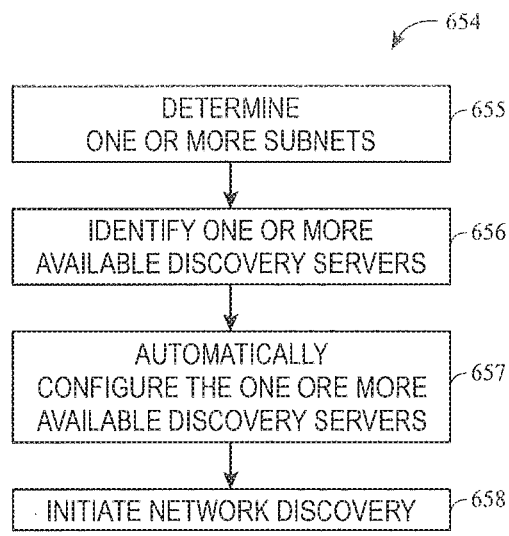
FIG. 13 is a process to accelerate configuration of a discovery server, in accordance with an embodiment.

FIG. 13 illustrates a process 654 to accelerate configuration of a discovery server (e.g., MID server 126). A discovery server may include a MID server 126 or a server the at least partially performs a discovery process without performing instrumentation and/or management performed by a MID server. The process 654 may be used in combination with any of the embodiments discussed herein. Furthermore, the process 654 (as well as other processes discussed herein) may be at least partially embodied in hardware, software, or a combination thereof. For instance, each of the blocks discussed herein may correspond to an operation that is performed using one or more hardware processors (e.g., processors 202) via instructions stored in non-transitory, tangible, and computer-readable medium. The process 654 includes determining one or more subnets from multiple subnets (block 655). Each of the one or more subnets selected is associated with tasks. In response to determining the one or more subnets, identify one or more available discovery servers (block 656). As previously discussed, identification of the one or more available discovery servers includes using business rules and ability of the discovery servers to access the target one or more subnets. The identified one or more discovery servers are automatically configured based at least in part on the one or more subnets selected (block 657). After configuring the one or more discovery servers, network discovery is initiated to perform respective scheduled tasks (block 658). As previously discussed, the network discovery may be bifurcated into a first discovery that discovers devices and a second discovery that utilizes credentials for devices discovered in the first discovery to obtain additional information and/or discover additional devices.

Figure 14:
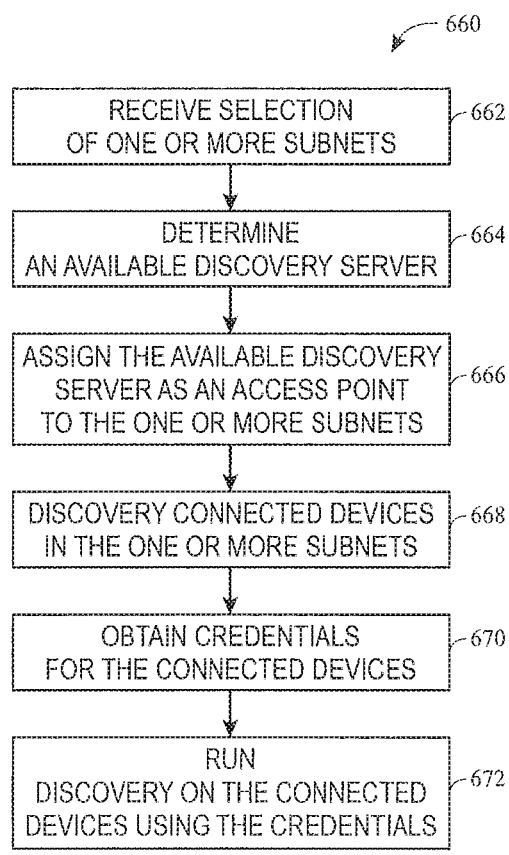
FIG. 14 is a process of an iterative discovery

FIG. 14 illustrates a process 660 to set up a discovery server. A selection of one or more subnets is received (block 662). As previously discussed, the selection may be received via the client 102. A discovery server is determined to provide access to at least one of the one or more subnets (block 664). This determination may be made in the client 102, cloud service 104, and/or the MID server 126. The available discovery server is assigned as an access point to the one or more subnets (block 666). Connected devices in the one or more subnets are discovered via the discovery server (block 668). For the connected devices, credentials are obtained (block 670). For example, the credentials may be obtained via the client 102. Using the credentials, discovery is run on the connected devices (block 672).

Figure 15:
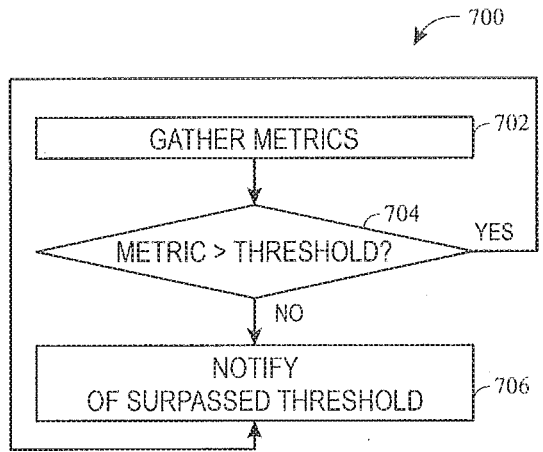
FIG. 15 is a process for monitoring one or more discovery servers, in accordance with an embodiment.

The guided setup and accelerator may also be used to provide information about and/or manage a discovery server (e.g., MID server 126). For example, FIG. 15 illustrates a process 700 for monitoring one or more discovery servers. The cloud service 104 gathers metrics related to the discovery server (block 702). In some embodiments, the discovery server or the client 102 may gather the metrics. For example, the discovery server may send back information about CPU consumption/availability, memory consumption/availability, and/or disk space consumption/availability. For instance, the discovery server may notify the cloud service 104 that the disk space in a host device for the discovery server is consumed to some degree (e.g., 90%) indicate that the disk space is nearly completely consumed. In some embodiments, the metrics are only sent back after a threshold has been passed. Alternatively, the metrics may be passed to the cloud service 104 to analyze the metrics rather than analyzing the metrics at the discovery server directly. The gathering of metrics may be in response to a gathering metrics request or may occur automatically using a metric gathering schedule.

Using the gathered metrics, the discovery server (and/or the cloud service 104 and/or the client 102) determines whether the gathered metrics indicate that a threshold(s) has been surpassed (block 704). In some embodiments, the threshold may be one of many thresholds pertaining to CPU consumption/availability, memory consumption/availability, disk space consumption/availability, and/or other computing resources available to the discovery server. In some embodiments, the thresholds may be static thresholds that do not change. Additionally or alternatively, one or more of the thresholds may be dynamically set based on various factors such as usage, predicted usage, and/or other reasons.

In some embodiments, the thresholds of various types may be dependent upon each other. For example, when CPU consumption is relatively high (e.g., 90%), the memory consumption threshold may be set at a lower value than if the CPU consumption is relatively low (e.g., 25%). In some embodiments, these thresholds may be independent of each other.

When the threshold(s) is surpassed, the cloud service 104 may then notify such consumption (block 706). For example, the cloud service 104 may generate an electronic mail message, a text message, a notification that is displayed through a cloud management interface on the client 102, and/or any other suitable methods of notifying a user. In some embodiments, a notification may be sent to a vendor of such consumption. For example, the user may select an option to have a vendor contact the user when a threshold (e.g., disk space consumed percentage) is surpassed. In such embodiments, the user may set these thresholds, user set thresholds that the user did not personally set, and/or dynamic thresholds.

Figure 16:
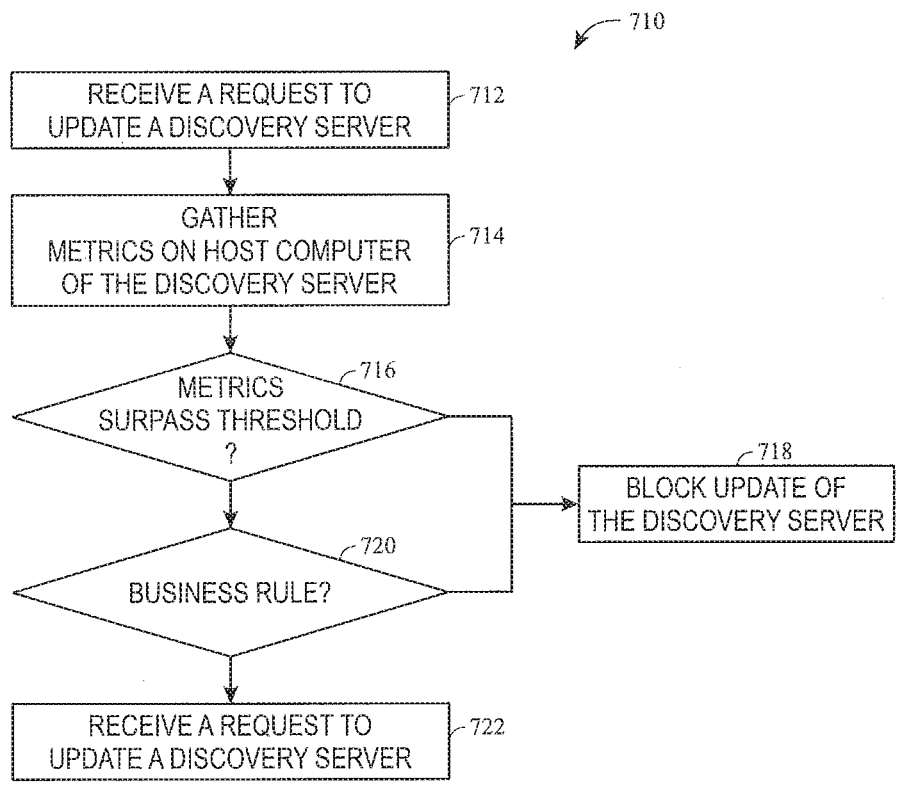
FIG. 16 is a process for updating a discovery server, in accordance with an embodiment.

Such metrics-based thresholding may also be used during specific scenarios. For example, a metrics-based threshold pre-check may be performed when a discovery server update is requested. Such thresholding may prevent the host computer for the discovery server from beginning an update that cannot be completed thereby causing the discovery server to enter an at least partially failed condition. FIG. 16 is a flow diagram of a process 710 for updating the discover server. A request is received to update the discovery server (block 712). The cloud service 104, the client 102, and/or the discovery server may receive and/or originate the update request. Metrics are gathered for the discovery server (block 714). The client 102, the cloud service 104, and/or the discovery server may gather the metrics. Furthermore, gathering the metrics may be performed in response to the update request and/or may be a periodic gathering (e.g., such as that used in the process 700 of FIG. 15).

After an update request has been received and metrics have been gathered, the discovery server, the client 102, and/or the cloud service 104 determines whether the metrics indicate whether one or more factors have surpassed respective thresholds (block 716). As previously discussed, the thresholds may be preset thresholds, user-defined thresholds, and/or dynamic thresholds. Furthermore, each threshold may be an independent threshold related to a specific metric. Additionally or alternatively, thresholds may be bundled to correspond to more than one single metric. For example, a single threshold may have a combination of a CPU consumption threshold, a memory consumption threshold, a disk space consumption threshold, and/or other thresholds related to processing resources of the host computer for the discovery server. The thresholds may also be set for a specific update. For example, if a server update is requested that requires at least a certain amount of disk space (e.g., 1 GB), the threshold for the specific update to the discovery server may be set to that amount.

If a threshold is surpassed, an update to the discovery server is blocked (block 718). In some embodiments, blocking the update includes notifying that the update has been blocked. For example, the blocked update may be sent similar to the notification of FIG. 15 and/or may be stored in an issue log.

Even if the threshold is not surpassed, the update may be blocked. Business rules may also be used to manage updates. Thus, the discovery server, the client 102, and/or the cloud service 104 may determine whether the update would violate any business rules (block 720). For example, the business rules may include determining whether predicted usage will be high, whether a current discovery process is occurring, whether an imminent discovery process is scheduled before the update would complete, and/or other concerns that may cause an update to be inefficient. When business rules are contravened by an update, the update may be blocked until the reason for the business rule has been ameliorated. When no business rules or thresholds are violated, the discovery server is updated (block 722).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing[a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system to accelerate discovery, comprising:
a non-transitory memory; and
one or more hardware processors configured to read instructions from the non-transitory memory to perform operations comprising:
selecting one or more subnets from a plurality of subnets, wherein each of the one or more subnets selected is associated with a respective plurality of scheduled tasks;
responsive to selecting the one or more subnets, identifying one or more available discovery servers from a plurality of discovery servers;
configuring the one or more identified discovery servers based at least in part on the one or more subnets selected; and
responsive to configuring the one or more identified discovery servers, using the one or more configured discovery servers to initiate discovery on the one or more selected subnets to perform the respective plurality of scheduled tasks;
receiving a request to update the one or more configured discovery servers used to discover the one or more selected subnets;
in response to the request, gathering a metric relating to processing resources of one or more host computers for the one or more configured discovery servers;
determining whether the metric has surpassed one or more thresholds;
when the metric has surpassed the one or more thresholds, blocking the update of the one or more configured discovery servers; and
when the metric has not surpassed the one or more thresholds, updating the one or more configured discovery servers.

2. The system of claim 1, wherein the respective plurality of scheduled tasks comprises discovering one or more configuration items (CIs) and prompting credentials used for the one or more CIs.

3. The system of claim 2, wherein the operations comprise:
determining whether the credentials fail for a CI of the one or more CIs; and
when the credentials fail for the CI, re-request the credentials.

4. The system of claim 2, wherein the operations comprise creating additional schedules of tasks based on one or more configuration items (CIs) discovered from the discovery, wherein at least one of the additional schedules of tasks comprises refreshing a dashboard associated with the one or more CIs.

5. The system of claim 1, wherein initiating the discovery comprises using probes to discover connected devices on the one or more subnets.

6. The system of claim 5, wherein the probes comprise a network mapper probe or a port scanning probe that scans ports on an range of IP addresses.

7. The system of claim 1, initiating the discovery comprises:
discovery that discovers devices on the one or more subnets; and
a full discovery that discovers particular information about the devices on the one or more subnets and discovers devices not found on the one or more subnets during the discovery.

8. The system of claim 1, wherein the operations comprise assigning at least one of the one or more available discover servers to the one or more subnets for future discovery processes.

9. The system of claim 1, wherein the one or more available discovery servers comprise the discovery servers of the plurality of discovery servers that are able to access the one or more subnets or a device on the one or more subnets.

10. The system of claim 1, wherein the scheduled tasks comprises:
a first task for running discovery on a first type of configuration item (CI); and
a second task for running discovery on a second type of CI.

11. The system of claim 10, wherein the first type of CI comprises a first operating system, and the second type of CI comprises a second operating system.

12. A method for setting up a discovery server comprising:
receiving a selection of one or more subnets to discover;
identifying an available discovery server that is able to access at least one of the one or more subnets;
assigning the available discovery server as an access point to the one or more subnets;
configuring the available discovery server;
discovering connected devices in the one or more subnets using the configured discovery server;
obtaining credentials for the connected devices; and
running discovery on the connected devices using the credentials;
receive a request to update the configured discovery server used to perform the discovery;
gather a metric relating to processing resources of a host computer for the configured discovery server;
determine whether the metric has surpassed one or more thresholds;
when the metric has surpassed the one or more thresholds, block the update of the configured discovery server; and
when the metric has not surpassed the one or more thresholds, update the configured discovery server.

13. The method of claim 12, comprising displaying the connected devices in a network topology map showing connections between the connected devices.

14. The method of claim 13, wherein displaying the connected devices in the network topology map includes showing all discovered configuration items (CIs) at a particular location along with their connections to each other and to devices outside of the particular location.

15. The method of claim 13, wherein obtaining credential comprises obtaining the credentials using the network topology map.

16. The method of claim 12, wherein determining the available discovery server comprises selecting the available discovery server from a plurality of discovery servers based at least in part on an available physical location of the available discovery server, processing resources of a respective host machine of each of the available discovery server, preferred vendors, credentials available, or any combination thereof.

17. The method of claim 12, wherein determining the available discovery server comprises selecting the available discovery server from a plurality of discovery servers based on which of plurality of the discovery servers provides access to a greater number of subnets of the one or more subnets.

18. Non-transitory, tangible, and computer-readable medium storing instructions thereon that, when executed, are configured to cause one or more processors to:
select one or more subnets from a plurality of subnets, wherein each of the one or more subnets selected is associated with a respective plurality of scheduled tasks;
responsive to selecting the one or more subnets, identify a discovery server from a plurality of discovery servers;
configure the identified discovery server;
responsive to configuring the identified discovery server, use the configured discovery server to initiate discovery on the one or more selected subnets to perform the respective plurality of scheduled tasks;
receive a request to update the configured discovery server used in discovery on the one or more selected subnets;
gather a metric relating to processing resources of a host computer for the configured discovery server;
determine whether the metric has surpassed one or more thresholds;
when the metric has surpassed the one or more thresholds, block the update of the configured discovery server; and
when the metric has not surpassed the one or more thresholds, update the configured discovery server.

19. The non-transitory, tangible, and computer-readable medium of claim 18, wherein the instructions are configured to cause the one or more processors to:
gather the metric periodically; and
when the metric has surpassed the one or more thresholds, send a notification that the metric has surpassed the one or more thresholds.

20. The non-transitory, tangible, and computer-readable medium of claim 18, wherein the metric pertains to processor consumption, processor availability, memory consumption, memory availability, hard disk consumption, hard disk availability, or a combination thereof.

* * * * *